US012576552B2

(12) United States Patent
Honkanen

(10) Patent No.: US 12,576,552 B2
(45) Date of Patent: Mar. 17, 2026

(54) DEBARKING DRUM, METHOD AND SYSTEM FOR DEBARKING OF WOOD

(71) Applicant: Valmet Technologies Oy, Espoo (FI)

(72) Inventor: Tommi Honkanen, Pori (FI)

(73) Assignee: Valmet Technologies Oy, Espoo (FI)

( * ) Notice: Subject to any disclaimer, the term of this patent is extended or adjusted under 35 U.S.C. 154(b) by 254 days.

(21) Appl. No.: 18/285,482

(22) PCT Filed: Apr. 1, 2022

(86) PCT No.: PCT/FI2022/050211
§ 371 (c)(1),
(2) Date: Oct. 3, 2023

(87) PCT Pub. No.: WO2022/214738
PCT Pub. Date: Oct. 13, 2022

(65) Prior Publication Data

US 2024/0181670 A1 Jun. 6, 2024

(30) Foreign Application Priority Data

Apr. 7, 2021 (FI) ...................................... 20215414

(51) Int. Cl.
*B27L 1/02* (2006.01)

(52) U.S. Cl.
CPC .................................... *B27L 1/025* (2013.01)

(58) Field of Classification Search
CPC ............... B27L 1/04; B27L 1/05; B27L 1/025
See application file for complete search history.

(56) References Cited

U.S. PATENT DOCUMENTS

| | | | | |
|---|---|---|---|---|
| 3,973,606 A | | 8/1976 | Carbonneau | |
| 4,583,575 A | * | 4/1986 | Lundmark | B27L 1/025 241/183 |
| 4,784,197 A | | 11/1988 | Alander et al. | |

FOREIGN PATENT DOCUMENTS

| | | | | | |
|---|---|---|---|---|---|
| FI | 20040360 A | | 9/2005 | |
| GB | 1399793 A | * | 7/1975 | B27L 1/025 |
| RU | 197796 U1 | * | 5/2020 | B27L 1/04 |
| WO | 2005084897 A1 | | 9/2005 | |

OTHER PUBLICATIONS

Written Opinion of the International Searching Authority for PCT/FI2022/050211, dated Jul. 29, 2022.
International Search Report for PCT/FI2022/050211, dated Jul. 29, 2022.

* cited by examiner

*Primary Examiner* — Matthew Katcoff
(74) *Attorney, Agent, or Firm* — Stiennon & Stiennon

(57) ABSTRACT

A debarking drum (1) for the debarking of wood (2) has an essentially horizontal cylindrical drum (10) supported to revolve around its longitudinal axis. The drum has a first end (12) and a second end (14) with an inner surface with inwardly projecting longitudinally extending debarking iron sections (16). Bark openings or slots (20) extend through the drum inner surface (18) and multiple rigid studs (22) protrude inwardly from the inner surface (18) and are positioned between the debarking iron sections (16). The studs operate to break the bark (3) of the wood (2) for debarking. The studs (22) are positioned along a partial length (L) of the drum (10) between the first end (12) and the second end (14). The invention also relates to a method and system for the debarking of wood by the debarking drum.

17 Claims, 7 Drawing Sheets

Prior art

DEBARKING DRUM, METHOD AND SYSTEM FOR DEBARKING OF WOOD

CROSS REFERENCES TO RELATED APPLICATIONS

This application is a US national phase of PCT/FI2022/050211 filed on Apr. 1, 2022, and claims priority on FI 20215414, filed Apr. 7, 2021, the disclosures of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a debarking drum for the debarking of wood, including an essentially horizontal cylindrical drum, which is supported to revolve around its longitudinal axis, which drum includes:

a first end for the feeding of wood into the drum, a second end for the removing of wood from the drum, debarking iron sections adapted on an inner surface that belongs to the drum, in the longitudinal direction of the drum on the circumference of the drum with a gap from each other to lift the wood upwards on the circumference of the drum when the drum is revolving and to release the bark of the wood, and bark openings adapted on the inner surface of the drum to remove the bark, which comes off from the wood, out of the drum.

The invention also relates to a method and system for the debarking of wood.

FIG. 1 shows a prior art process in wood handling, the purpose of which is to debark wood for subsequent processing. In accordance with FIG. 1, the wood is fed using a feeder conveyor 50 into a debarking drum 1, where the bark of the wood is removed. The debarking drum 1 includes a cylindrical and hollow drum 10 supported essentially horizontally onto support and rotating means 34, which drum 10 comprises a first end 12 for the feeding of wood and a second end 14 for the removing of wood as well as bark openings 20 for the removing of bark, which has come off from the wood, out of the drum 10. The debarked wood is removed from the debarking drum 10 to on-carriage conveyors and is taken over stone traps 56 and via washers 54 to subsequent processing, such as to a chipper 58 or refiner mechanical pulp plant, depending on the process. The bark that has dropped through the bark openings 20 of the drum 10 is utilized, for example, in energy production by combusting it.

The debarking drum 1 works so that the drum 10, which is adapted at an angle at a ratio of $1/50$-$1/150$ with respect to the horizontal, rotates supported and rotated by support and rotating means around its longitudinal axis, when wood 2 is fed into it in accordance with FIG. 2. The drum 10 is filled approximately 50% full of wood 2, which is lifted upwards on the inner surface 18 of the drum 10 by debarking iron sections 16 fastened on the inner surface 18 of the drum 10 with a gap 19 from each other when the drum 10 is rotating. When the wood 2 has lifted sufficiently high on the circumference of the drum 10, the wood 2 drops again to the bottom of the drum 10 mainly colliding with each other, whereby the bark 3 of the wood 2 is broken and ultimately comes off from the wood 2 and is carried out of the drum via bark openings 20 formed in the gaps 19 on the inner surface 18 of the drum 10. Due to the inclination of the drum 10, the wood 2 progresses slowly in the longitudinal direction of the drum 10, ultimately exiting from the other end 14 of the debarking drum 1, presented in FIG. 1. Such debarking drum is known, for example, from patent application FI20040360A.

The release of bark from various wood species requires different debarking control parameters in order to reach the desired degree of cleanliness. Degree of cleanliness here means the degree to which bark comes off the wood. As an example, the bark of eucalyptus comes off much more poorly from the surface of the wood than the bark of birch from its surface. The control parameters used include, for example, the retention time of wood in the debarking drum and the rotating speed of the drum. Wood species that are more difficult to debark require a longer retention time in the drum and a higher rotating speed. This leads to a higher electricity consumption and bigger wood losses to reach the same degree of cleanliness as with wood species that are easier to debark. On the other hand, raising the degree of cleanliness also increases the wood losses taking place in debarking. This is particularly problematic in prior art debarking drums and method for the debarking of wood, where debarking is based primarily on the contacts of pieces of wood with each other, which contacts are relatively similar regardless of the wood species.

SUMMARY OF THE INVENTION

The object of the present invention is to provide a debarking drum that is more effective than prior art debarking drums and that can be used for increasing the efficiency of debarking. Another object of the present invention is to provide a system and method for the debarking of wood that are more effective than prior art solutions and that can be used for increasing the efficiency of debarking.

This object can be achieved by means of a debarking drum for the debarking of wood, which drum includes an essentially horizontal cylindrical drum, which is supported to revolve around its longitudinal axis. The drum includes a first end for feeding the wood into the drum, a second end for removing the wood from the drum, and debarking iron sections adapted on the inner surface that belongs to the drum, in the longitudinal direction of the drum on the circumference of the drum at a gap from each other to lift the wood upwards on the circumference of the drum when the drum is revolving and to release the bark of the wood. Moreover, the drum includes bark openings adapted on the inner surface of the drum for the removal of the bark, which comes off from the wood, out of the drum, and studs adapted on the inner surface of the drum between the debarking iron sections in order to break the bark of the wood for the debarking of the wood, which studs are adapted in connection with the first end of the drum on a partial length of the length of the drum between the first end and the second end.

By using studs to break the bark of the wood in connection with the first end of the debarking drum, it is possible to facilitate the release of the bark when the pieces of wood collide with each other. The studs break the uniform structure of the bark at several places, in which case the impacts between the pieces of wood effectively release bark from the wood right from the beginning of the debarking process. In this case, to reach the same degree of cleanliness, the cumulative number of impacts between pieces of wood required by debarking is reduced, in which case the retention time of the wood in the debarking drum can be shorter than in prior art debarking drums. On the other hand, the debarking drum according to the invention can be used to minimize wood losses, because the studs are only placed in connection with the first end of the drum, in which case they facilitate the release of the bark without causing wood losses. Moreover, the debarking drum according to the invention is especially well suited to wood species that are difficult to debark, where the release of the bark has required a high energy consumption in prior art debarking drums and caused bigger wood losses. On the other hand, insufficient debarking may cause, for example, extraction problems in subsequent processes. In this connection, the debarking iron sections are in the circumferential direction of the drum at a gap from each other.

The studs between two adjacent debarking iron sections are advantageously placed in rows, which consecutive rows are placed in an overlapping manner with respect to each other in the longitudinal direction of the drum. The studs placed in rows protect each other against impacts directed at them by the wood so that no individual stud is subject to impacts coming directly from the side, but instead, the impacts are directed at several studs simultaneously, being directed primarily in the radial direction of the drum.

The partial length is advantageously 10-40% of the length of the drum between the first end and the second end. In this case, the studs only break bark at the first end of the drum, but they do not cause impacts on the wood that has already been debarked partially or mostly and that moves in connection with the second end of the drum.

Advantageously, there are studs on the inner surface of the drum on at least every second consecutive gap formed by two debarking iron sections on the circumference of the drum. The use of studs even on only every second gap between the debarking iron sections causes a sufficient effect that breaks the bark of the wood in order to facilitate debarking significantly. On the other hand, a lesser use of studs reduces the investment costs of the debarking drum. In this context, the term "consecutive" means the rotating direction of the drum, not the longitudinal direction of the debarking drum.

In accordance with an advantageous embodiment, the studs are formed directly on the drum. In this case, the material costs in the manufacturing of the drum are small. This is the recommended mode of implementation in the case of new debarking drums, but retrofitting directly on the drum is also possible. In this context, the definition "directly on the drum" means that the studs are fastened directly to the material that forms the inner surface of the drum, not, for example, to a separate cassette to be fastened to the drum.

Alternatively, the studs can be formed on protective plates that form the inner surface of the drum and that are fastened in a detachable manner. By means of the protective plates, the studs can be integrated easily on existing debarking drums.

The distance of the studs from each other in each gap can be 10-60 mm, advantageously 25-40 mm. In this case, the studs are sufficiently close to each other to protect each other against impacts caused by pieces of wood in the lateral direction.

The distance of each debarking iron section to the closest studs can be 10-60 mm, advantageously 25-40 mm. In this way, the studs in the first and last row are also protected against impacts in the lateral direction, when they are located close to the debarking iron section, which prevents the impacts from being directed at the studs from the side.

The studs are advantageously placed evenly at the above-mentioned selected distance from each other on the entire area of the gap on the partial length of the drum. In this case, there are enough studs to break the bark of the wood.

In accordance with one embodiment, the studs in consecutive rows are adapted in an overlapping manner to form a spiral in the longitudinal direction of the drum to speed up or slow down the progress of the wood in the drum in accordance with the selected direction of the spiral. When the direction of the spiral is against the rotating direction of the drum, the progress of the wood in the drum slows down, and when the direction of the spiral is the same as the rotating direction of the drum, the progress of the wood in the drum speeds up. In this way, it can be ensured, if needed, that the wood progresses in the drum forward, even though the friction between the wood and the drum in the longitudinal direction of the drum would be greater due to the use of the studs than in prior art debarking drums.

Each stud advantageously includes two materials radially with respect to the longitudinal direction of the stud, namely a surface material and a core material, of which the core material is harder than the surface material, enabling that the stud becomes sharper as the stud wears down. In this way, the studs stay sharp throughout their service life without a need to sharpen the studs. A sharp stud breaks the bark of the wood more effectively and hence accomplishes intensified release of the bark from the wood.

The cross section of the stud is advantageously round, but it can also be another shape. A stud with a round cross section is easy to manufacture and has a symmetrical structure.

The surface material of the stud can be of steel, and the core material, the hardness of which is more than 800 HV, can advantageously be of tungsten carbide. The use of steel as the surface material guarantees that the stud can be fastened well to the drum or alternatively to the protective plate. On the other hand, a sufficiently strong material as the core material guarantees that the stud remains sharp and does not wear short too quickly.

Alternatively, more than one half of the studs can be studs equipped with a harder core material while the other studs are entirely of a single material. In this way, savings can be made in the material costs of the studs.

The height of a stud can be 10-25 mm, advantageously 13-19 mm. In this case, the stud is sufficiently low so that its fastening is not subject to an excessive torsion when the wood strains the stud in the lateral direction.

The diameter of a stud can be 10-20 mm close to the root of the stud, in other words the fastening point to the drum or protective plate. The diameter of the stud becomes narrower towards the tip of the stud, especially with worn studs, which have become sharp.

The studs are advantageously fastened perpendicularly with respect to their longitudinal direction to the inner surface of the drum or to the protective plate.

The purpose of the system according to the invention can be achieved by means of a system for the debarking of wood, which comprises a debarking drum and means to break the bark of wood for the debarking of wood. The debarking drum includes an essentially horizontal cylindrical drum, which is supported to revolve around its longitudinal axis, which drum includes a first end for the feeding of wood into the drum and a second end for the removing of wood from the drum, debarking iron sections adapted on an inner surface that belongs to the drum, in the longitudinal direction of the drum on the circumference of the drum with a gap from each other to lift the wood upwards on the circumference of the drum when the drum is revolving and to release the bark of the wood, and bark openings adapted on the inner surface of the drum to remove the bark, which comes off from the wood, out of the drum. The means for the breaking of the bark of the wood comprise studs for breaking the bark of the wood for the debarking of the wood, which studs are adapted alternatively either a) on the inner surface of the drum between the debarking iron sections, and the studs are adapted in connection with the first end of the drum on a partial length of the length of the drum between the first end and the second end, or b) on rotating elements that precede the debarking drum. This type of system, too, can be used for achieving the advantages of the debarking drum according to the invention, presented above, when the debarking of wood is intensified.

The purpose of the method according to the invention can be achieved by means of a method for the debarking of wood using a debarking drum, which includes an essentially horizontal cylindrical drum, which is supported to revolve around its longitudinal axis, in which method the wood is fed into the rotating drum from a first end of the drum, the wood is lifted upwards in the drum by means of the debarking iron sections in order to debark the wood as the wood drops on each other, and the bark of the wood is broken by using studs to facilitate debarking. Moreover, in the method the bark released from the wood is removed through the bark openings of the drum, and the debarked wood is removed from the rotating drum from the other end of the drum.

By means of the method according to the invention, it is possible to intensify the debarking of wood by breaking the uniform structure of the bark right at the beginning of debarking by using the studs. In this case, the bark comes off from the wood with fewer impacts between the pieces of wood, accelerating debarking and reducing wood losses. This enables that the desired degree of cleanliness of debarking can be achieved with a smaller energy consumption and faster than with prior art methods. Alternatively, it is also possible to use a shorter debarking drum, which reduces the investment costs.

It may also be considered that one significant advantage of the method according to the invention is that it facilitates the debarking of wood species, which are difficult to debark, particularly much, where such wood species have conventionally been challenging from the debarking point of view due to the poor release of the bark. Moreover, with wood species that are difficult to debark, the bark of the wood often comes off in the prior art method in long strips, which do not go through the bark openings of the drum, but form bark accumulations between the other end of the debarking drum and the conveyor that follows the debarking drum, impairing the operation of the process. Furthermore, the bark accumulations may carry with them impurities, such as stones, forward in the process, all the way to the chipper. In the method according to the invention, the bark that has been broken at several places by means of the studs comes off in smaller parts, not as long strips, whereby the pieces of bark that have come off are carried more easily through the bark openings to the outside of the drum and do not cause problems in the process.

The breaking of the bark of the wood advantageously takes place by means of studs placed in the drum in connection with the first end of the drum. This is the most advantageous way to implement the breaking of the bark, because in this case it is possible to utilize the weight of the wood as the wood presses the lowest pieces of wood in the drum against the studs.

Alternatively, the breaking of the bark of the wood takes place by means of mechanical debarking elements and studs instead of a debarking drum. In this case, a fully prior art debarking drum can be used, when the bark has been broken before the debarking drum using a studded feed roller, for example.

When comparing the debarking efficiency achieved with the debarking drum and method according to the invention with the corresponding figures of a prior art debarking drum and method with the same parameters, even the addition of just a few studs increases the debarking efficiency by 5-10% while at the same time the energy consumption decreases by 20%, even more. The wood losses can be reduced by 1-2%. Considering the size of current wood-processing plants, the financial benefits to be achieved can be in the range of millions of euros.

The debarking drum and method according to the invention are applicable to the debarking of wood irrespective of the subsequent processing of the wood. Particularly advantageous applications include debarking processes in the pulp and paper industry, but also the sawmill industry, for example. The debarking drum according to the invention can naturally be implemented as completely new products or by modifying existing debarking drums to become debarking drums according to the invention by the addition of studs.

BRIEF DESCRIPTION OF THE DRAWINGS

The invention is described below in detail by making reference to the enclosed drawings that illustrate some embodiments of the invention.

DESCRIPTION OF THE PREFERRED EMBODIMENTS

Figure 1:
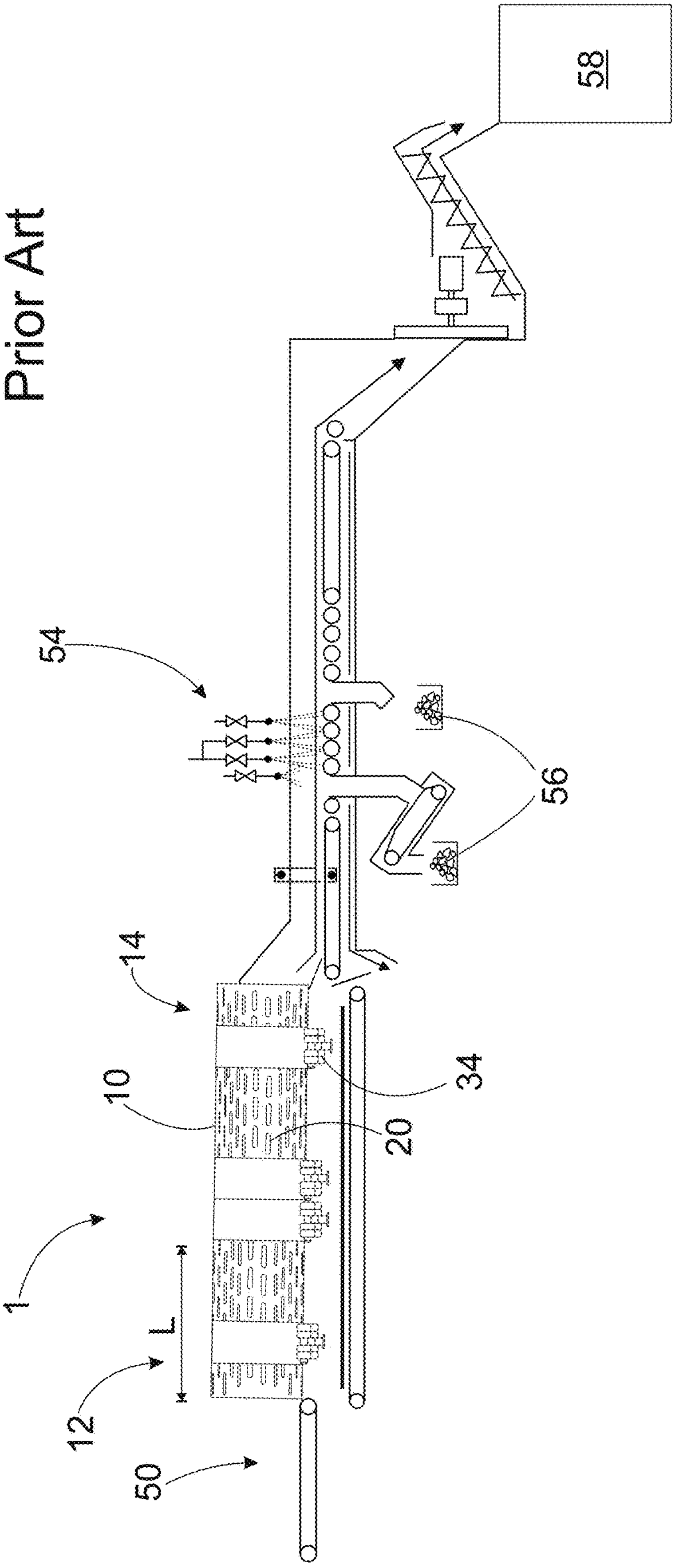
Prior Art Fig. 1
FIG. 1 shows a prior art debarking drum and the process around it as a figure in principle.
Figure 2:
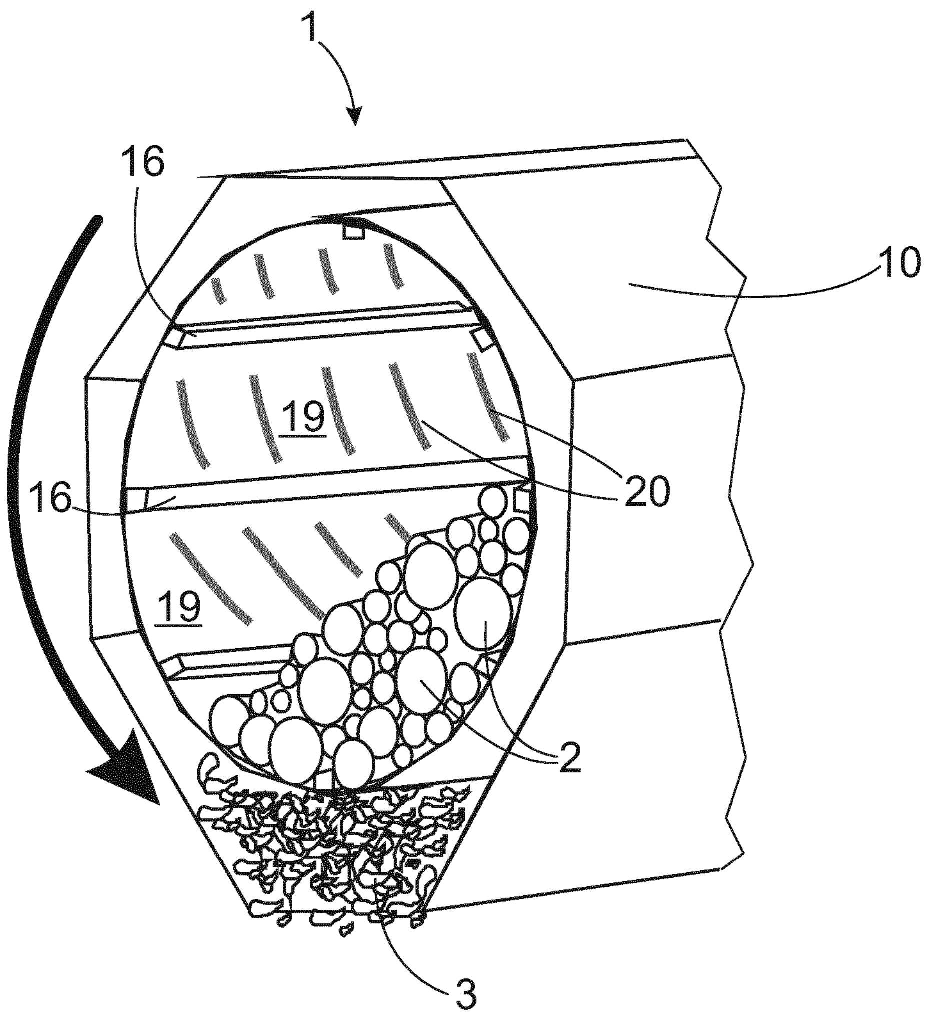
FIG. 2 shows an inlet end of a prior art debarking drum in an axonometric view.

It is to be understood in this context that the debarking drum according to the invention can be part of a fully corresponding process, which is described with a prior art debarking drum in FIG. 1. In this way, it can be thought that FIG. 1 also illustrates a debarking drum 1 according to the invention and the process around it.

The debarking drum 1 according to the invention includes, in accordance with prior art, a drum 10 and support and rotating means 34 presented in FIG. 1, by means of which support and rotating means 34 the hollow drum 10 is supported essentially horizontally, however at an angle of 1/50-1/150 (upward gradient with respect to the length of the drum) so that an open inlet or first end 12 included in the drum 10 is at a higher elevation than an open outlet or second end 14. This accomplishes a gravitational movement of wood in the debarking drum 1 in the direction of progress of the process through the debarking drum 1. The support and rotating means 34 can include, for example, hydraulically-supported rubber wheels, which are rotated by electric motors in order to accomplish rotation of the drum 10 taking place around its longitudinal axis, or other corresponding purposeful implementation.

Figure 3:
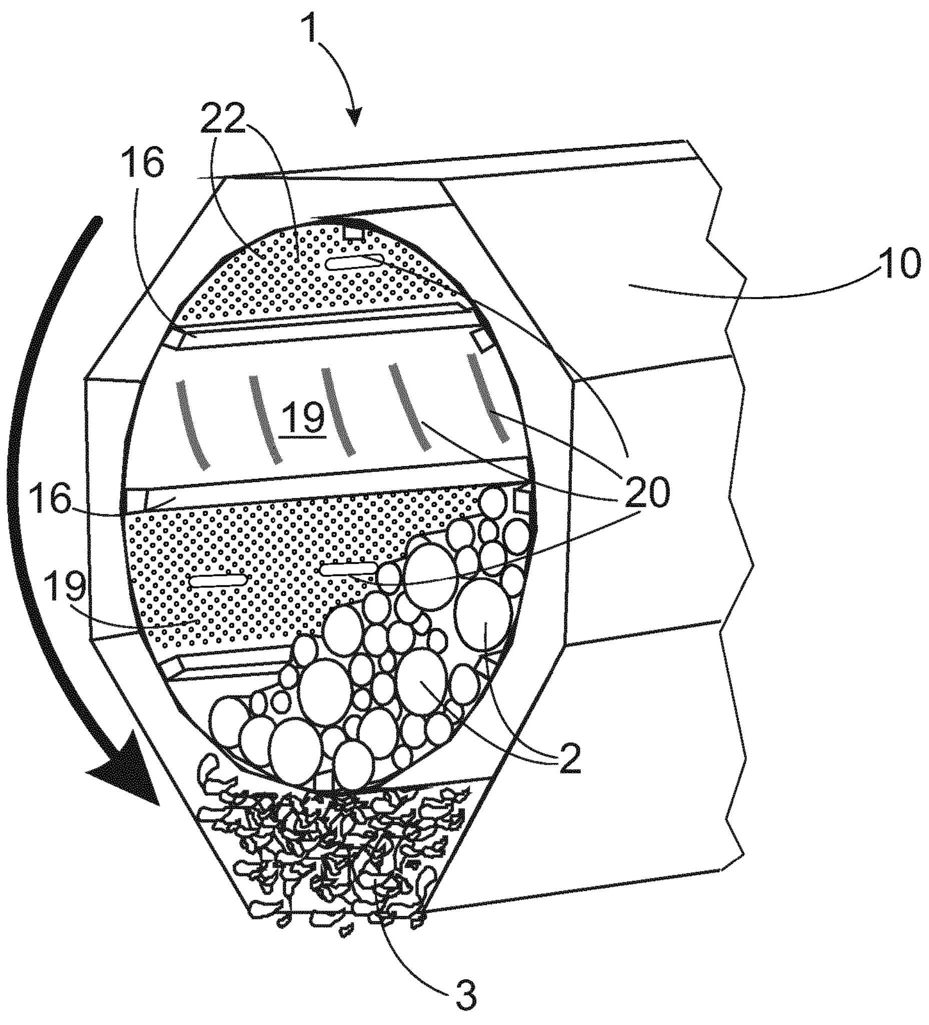
FIG. 3 shows an inlet end of a debarking drum according to the invention in an axonometric view.
Figure 5:
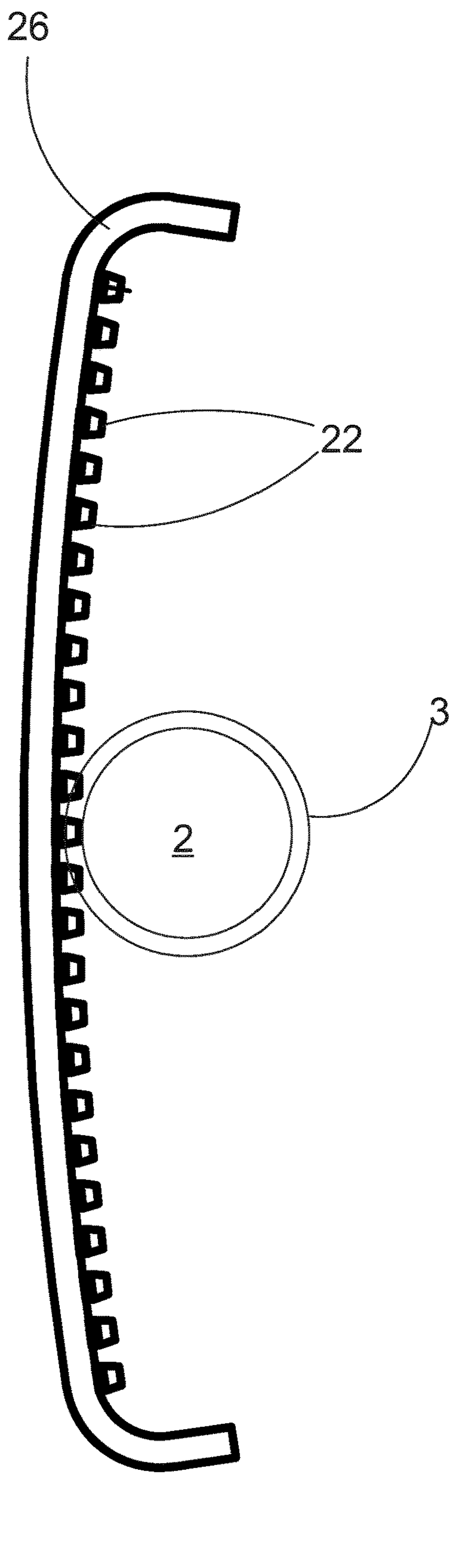
FIG. 5 shows studs of the debarking drum according to the invention, fastened to a protective plate and presented from the end of the protective plate.

Longitudinally extending debarking iron sections 16 are fastened to the interior of the drum 1 and are spaced circumferentially from one another to define circumferentially extending gaps 19. The debarking drum 1 according to the invention includes studs 22 formed on the inner surface 18 of the drum 10 shown in FIG. 3, in the circumferential gaps 19 between debarking iron sections 16, in order to break the bark of the wood in accordance with the method according to the invention. The drum 1 has a longitudinal length in the direction of the drum's axis of rotation, and the studs 22 are formed advantageously on a partial length L, indicated in FIG. 1, which is less than the full longitudinal length of the drum, the partial length L of studs running from the inlet or first end 12 of the drum 10, which partial length can be 10-40% of the total length of the drum 10. In accordance with FIG. 3, there can be studs 22 in every second gap 19, for example, but the biggest effectiveness in the breaking of bark is achieved by using studs 22 in all gaps 19. When the drum 10 is rotating, the wood 2 on the bottom of the drum 10 is in contact with the studs 22, in which case the weight of the wood 2 that is on top of this wood 2 on the bottom is also directed at the lowest pieces of wood 2, pressing them against the studs 22. In this case, the studs 22 sink into the bark 3 of the wood 2, which bark 3 is presented in FIG. 5, breaking the uniform structure of the bark 3 around the surface wood that is underneath the bark of the wood 2. More specifically, the studs 22 break the outer shell of the wood, in other words the bark, the inner shell, in other words the phloem, and the cambium that is inside the inner shell, in order to remove these in debarking. When the drum 10 is rotating, the wood 2 moves upwards on the circumference of the drum 10 pushed by the debarking iron section 16, until ultimately the wood 2 drops from the circumference back to the bottom of the drum 10 on top of the wood 2 colliding with it. As a result of the impact, the bark, which has already been broken by the studs 22, is ripped off and comes off from the wood. The dimensions of the released pieces are often smaller than the corresponding pieces of prior art debarking drums, because the points of discontinuity caused by the studs in the bark are located fairly close to each other, like the placement of the studs, facilitating the release of small pieces of bark from the wood. The debarking iron sections 16 also release bark from the wood when the drum is rotating, but the impacts between the pieces of wood are the primary mechanism for releasing the bark.

Figure 4:
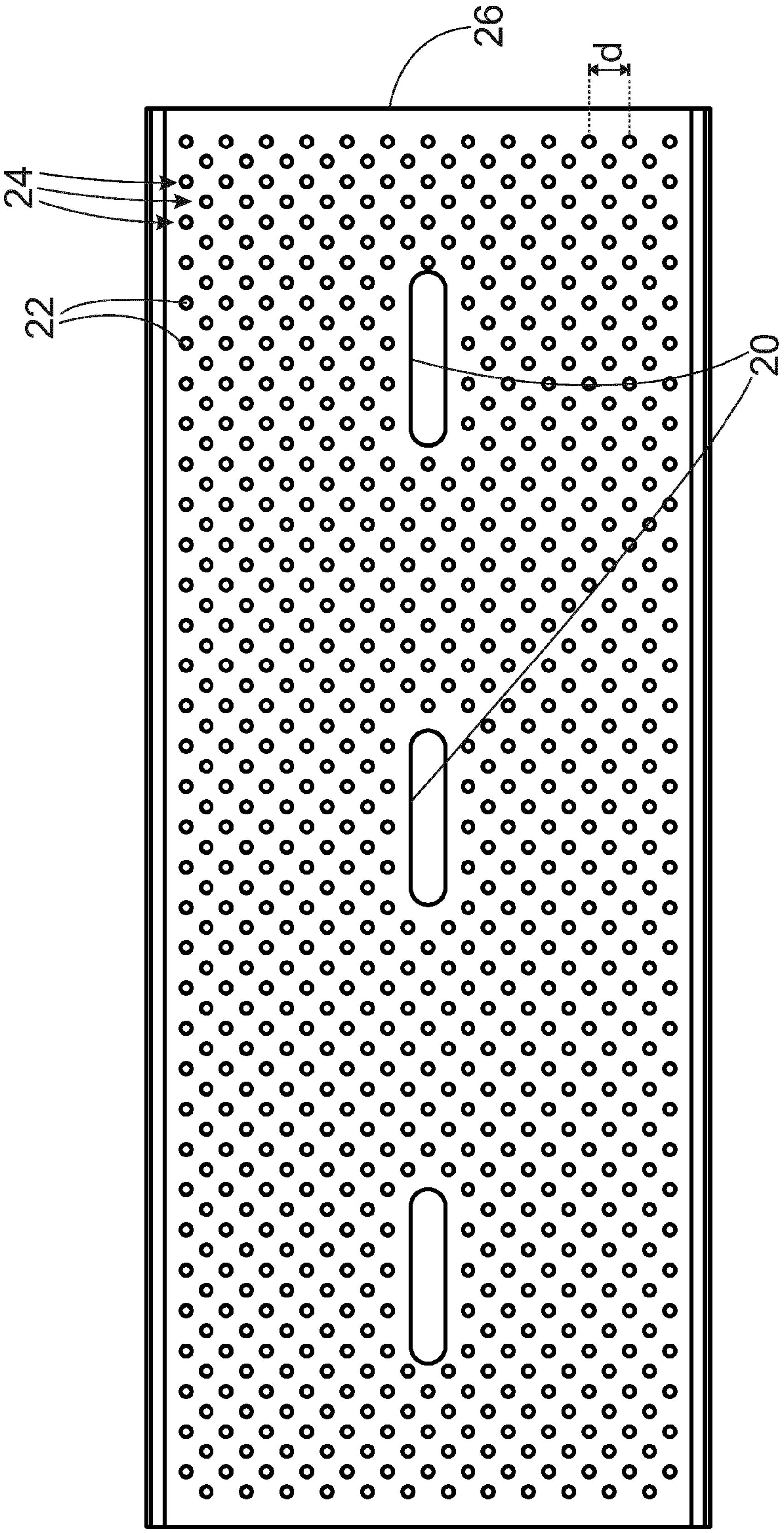
FIG. 4 shows studs of the debarking drum according to the invention, fastened to a protective plate and presented in the longitudinal direction of the studs.

The studs 22 can be fastened directly to the inner surface 18 of the drum 10 or alternatively to separate protective plates 26, one of which is shown in FIG. 4. Furthermore, alternatively the studs 22 can be formed into cassettes, which are adapted on guideways formed on the surface of the drum. The fastening directly to the inner surface of the drum 10 or to the protective plates 26 takes place advantageously by means of welding, for example, laser welding or resistance butt welding. For welding, an opening can be made in the drum or the protective plate for the stud, which opening enables a sturdier fastening of the studs than a fastening directly to an existing uniform surface. It is advantageous to use laser welding in new drums in connection with the welding of studs directly to the drum or in connection with the protective plates. Instead of welding, threads can also be machined in the inner surface of the drum or in the protective plates, and the studs can be fastened by means of counter threads and a thread locking agent.

Advantageously, existing prior art debarking drums can be modified to become debarking drums according to the invention by installing in them protective plates equipped with studs in connection with the first end of the debarking drum. The protective plates can be fastened between the debarking iron sections 16 by welding on site or by means of bolt fastening, for example. The purpose of the protective plates has traditionally been to protect the debarking drum against impacts caused by the wood. Protective plates can also be used to extend the service life of existing debarking drums by protecting already worn internal surfaces of the drum by means of protective plates that serve as wear surfaces. Now the protective plates can serve as a fastening base of the studs to the drum.

In accordance with FIG. 4, the studs 22 are advantageously adapted in rows 24, which are advantageously overlapping with respect to each other in the longitudinal direction of the drum, in other words their offset with respect to the debarking iron sections 16 varies from one row to another. Advantageously, every second row has the same offset. The overlapping of the rows is advantageously selected so that a stud in one row is placed between two studs in the next row, in the middle of the distance between these, in the shape of a diamond. In this way, the stud protects the studs in the second row against impacts in the lateral direction. This is especially important, because due to the welding fastening of the studs, the studs withstand stress in their longitudinal direction well, but they withstand directly cross-directional impacts poorly, and these may dislodge a stud. The distance d of the studs 22 from each other in each gap is 10-50 mm, advantageously 25-40 mm. The distance of the studs 22 from a debarking iron section is also the same, in which case the studs protect each other in the longitudinal direction of the drum, and the debarking iron sections protect the outermost studs in the circumferential direction.

According to one embodiment, the rows of studs can be installed so that they form the shape of a spiral in the longitudinal direction of the drum. The selection of the direction of the spiral influences the characteristics of the drum to carry wood in the longitudinal direction of the drum from the first end towards the second end. If the spiral is formed in the rotating direction of the drum, the spiral intensifies the travel of the wood in the longitudinal direction of the drum, and, when selected in an opposite manner, it slows the travel of the wood.

Bark openings 20 are formed in the protective plates or directly in the inner surface of the drum which pass through the drum and thus communicate between the interior and the exterior of the drum and allowing the passage of bark therethrough. The size of the bark openings 20 is determined by the diameter of the wood to be handled; typically, the bark openings are 40-50 mm wide. The criterion for the selection of the size of the bark openings is that the bark can fit through the bark openings out of the drum, but the wood or the pieces dislodged from the wood cannot fit through. The shape of the bark openings is advantageously elongated, in other words its length is greater than its width. The longitudinal direction of the bark openings can be parallel with the longitudinal direction of the drum, or diagonal.

The height of the studs in the radial direction of the drum can be 10-25 mm, advantageously 13-19 mm. The selection of the height of the stud is influenced by the wood species handled and the assumed amount of sinking of the stud so that the entire bark structure of the wood becomes broken. In accordance with FIG. 5, when the studs 22 are close to each other, several studs 22 are in contact simultaneously with an individual piece of wood 2, in which case the loading is distributed between these, reducing the loading of an individual stud 22. In accordance with FIG. 5, the studs 22 sink through the bark 3 of the wood 2 advantageously over the entire thickness of the bark. The sinking may change as the stud wears down, but the sinking should not be so great that it damages the surface wood under the bark, at least not significantly, exposing the wood to the creation of wood losses.

Figure 6A:
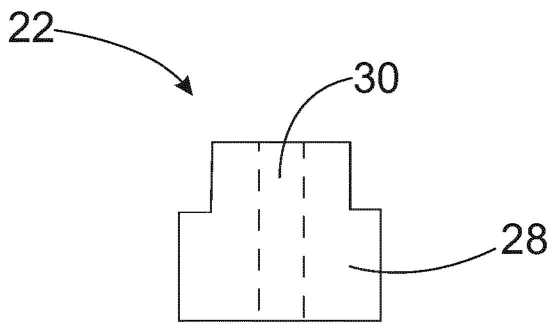
FIG. 6*a* shows an individual new stud separately presented from the side.
Figure 6B:
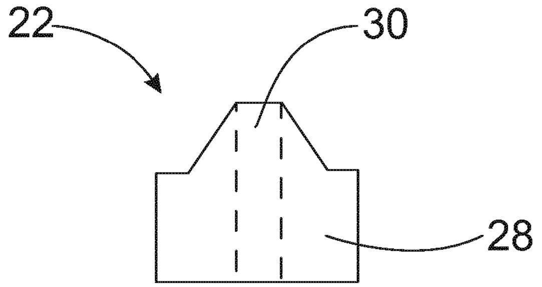
FIG. 6*b* shows an individual worn stud separately presented from the side.

Advantageously, the studs have a round shape in the transversal cross section with respect to the longitudinal direction, in which case the diameter of the stud at the root of the stud can be 5-15 mm, advantageously 8-12 mm. In accordance with FIG. 6*a*, the tip of the stud 22 can be blunt when it is new, but it wears and becomes sharp during operation in accordance with FIG. 6*b*. This can be accomplished by advantageously using in the stud a surface material 28, which is softer than the core material 30. In this way, the surface material 28 wears more during operation than the core material 30, enabling the stud to become sharper during operation without a separate need for sharpening. A softer surface material also enables a good fastenability of the stud by welding. The portion of the core material in the center of the stud can be 5-50% of the diameter of the stud, while the rest of the diameter is of the surface material.

According to one embodiment, there can also be two kinds of studs, a first kind, which have a core material that is harder than the surface material, and a second kind, which are fully of a single selected material, which is more affordable than the core material but more durable than the soft surface material, advantageously of more durable wear-resistant steel. The surface material is advantageously of wear-resistant steel with a sufficient wear resistance, while the core material is of a material with a hardness in excess of 800 HV, such as tungsten carbide. The stud used can be, for example, an AVT wear stud (high performance) manufactured by the Australian Antec Group Pty Limited.

Alternatively to a round cross-sectional shape, the shape of the cross section of the stud can also be elliptic or the shape of a diamond. A different cross-sectional shape can also be used to influence the sinking of the stud into the bark.

When using studs, the rotating speed of the drum can be a rotating speed in accordance with prior art debarking drums, such as 5-30 rpm. Too great a rotating speed increases energy consumption drastically and can cause damage to or dislodging of the studs.

Figure 7:
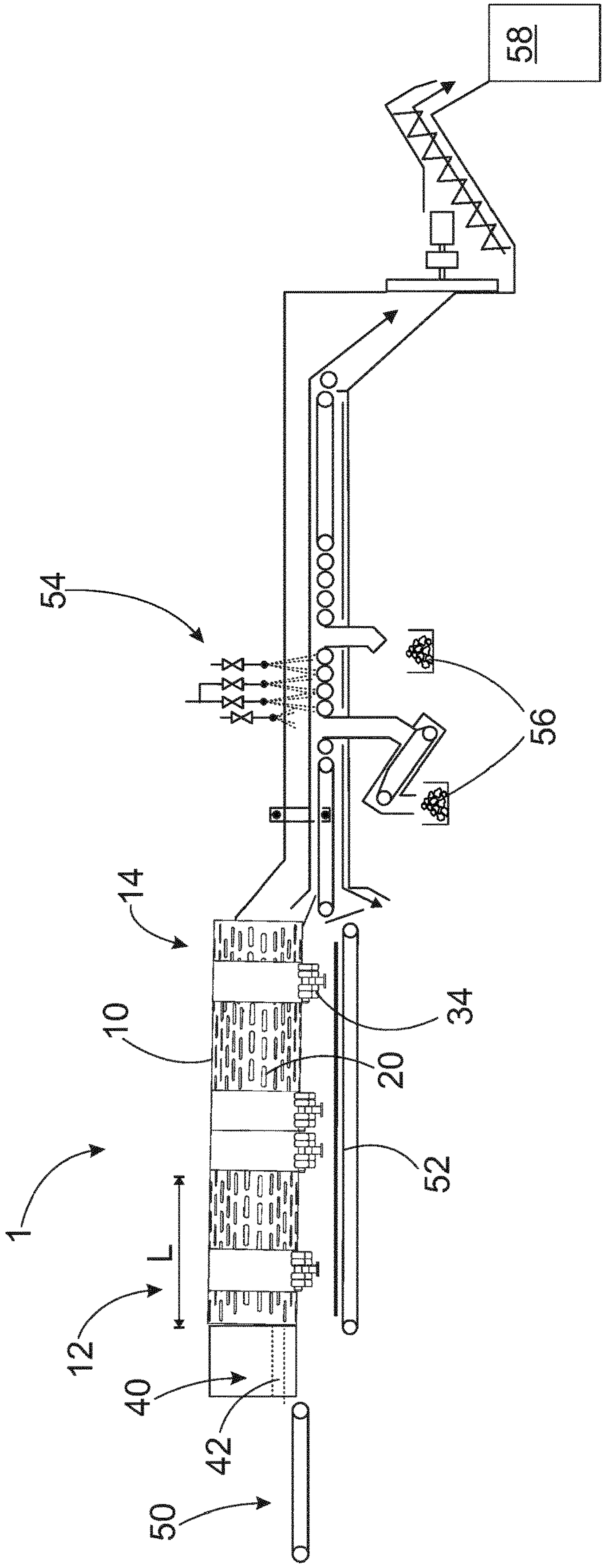
FIG. 7 shows a debarking drum according to a second embodiment of the system according to the invention, the means for the breaking of bark and the process around it as a figure in principle.

The method and system according to the invention for the debarking of wood can also be thought to be applied so that the bark of the wood is broken before the debarking drum. This could be implemented, for example, by means of rotating elements or rollers, such as hydraulically-loaded rollers, used for the feeding of wood, where the rotating elements or rollers would include studs like the debarking drum according to the invention. In this case, the debarking drum can be completely in accordance with the prior art. FIG. 7 shows the second embodiment of the system according to the invention, where the means 40 for the breaking of bark are studs, which are placed on separate rotating elements 42 before the debarking drum 1. The rotating elements can be, for example, a structure of the type known by the name Rotary Debarker or Rotabarker of Acrowood Corporation, where rotating discs are adapted consecutively on axes adapted in the longitudinal direction of the wood, and the studs are formed on the discs. When the wood travels through this device, the wood is subject to impacts from the studs, which impacts break bark. According to the first embodiment, the system is implemented so that the means for the breaking of bark are part of the debarking drum, like in the debarking drum according to the invention.

The diameter of the debarking drum according to the invention can be 3-9 m, advantageously 4-7 m. The length of the debarking drum can be 10-30 m, advantageously 15-25 m.

The invention claimed is:

1. A drum for the debarking of wood, including an essentially horizontal cylindrical drum, which is supported to revolve around its longitudinal axis, the drum comprising:

a first end for the feeding of wood into the drum;

a second end for the removing of wood from the drum, the drum having an interior for the passage of the wood therethrough, the interior having a drum total length in the direction of the longitudinal axis between the first end and the second end;

debarking iron sections fixed to an inner surface of the drum which extend in the longitudinal direction of the drum, wherein the debarking iron sections are positioned on an internal circumference of the drum and are spaced circumferentially from each other to define gaps therebetween, the debarking iron sections disposed to lift input wood upwards on the circumference of the drum when the drum is revolving and to release the bark of the wood when the wood drops;

bark openings formed to extend through the drum and extending from the inner surface of the drum to an exterior of the drum, the bark openings providing pathways for the removal of the bark which comes off from the wood to pass out of the drum; and rigid studs fixed to the inner surface of the drum and positioned in the gaps between the debarking iron sections, the studs disposed to project into the interior of the drum to break the bark of the wood for the debarking of the wood, wherein the studs are positioned at the first end of the drum along a partial length of the drum total length.

2. The drum of claim 1 wherein the partial length is 10-40% of the drum total length between the first end and the second end.

3. The drum of claim 1 wherein the studs on the inner surface of the drum are disposed on at least every second gap between the debarking iron sections on the circumference of the drum.

4. The drum of claim 1 wherein the studs are formed directly on the drum or on protective plates that form the inner surface of the drum and that are fastened to the drum in a detachable manner.

5. The drum of claim 1 wherein the studs extend inwardly into the interior of the drum a height, and wherein the height of each stud is 10-25 mm.

6. The drum of claim 5 wherein the height of each stud is 13-19 mm.

7. The drum of claim 1 wherein the studs are spaced from one another in a circumferential direction in each gap a distance of 10-60 mm.

8. The drum of claim 7 wherein the studs are spaced from one another in the circumferential direction in each gap a distance of 25-40 mm.

9. The drum of claim 1 wherein the distance of each debarking iron section from the closest studs is 10-60 mm.

10. The drum of claim 9 wherein the distance of each debarking iron section from the closest studs is 25-40 mm.

11. The drum of claim 1 wherein the studs between two adjacent debarking iron sections are placed in rows, and wherein consecutive rows are placed in an overlapping manner with respect to each other in the longitudinal direction of the drum.

12. The drum of claim 11 wherein the studs are arranged in an overlapping manner to form a spiral to speed up or slow down the progress of the wood in the drum in accordance with the selected direction of the spiral.

13. The drum of claim 1 wherein each stud extends into the interior of the drum about a first axis, and wherein each stud is comprised of a surface material and a core material positioned radially inwardly of the surface material, wherein the core material is harder than the surface material, enabling that the stud becomes sharper as the stud wears down.

14. The drum of claim 13 wherein the surface material of the stud is of steel, and the core material is of a material the hardness of which is more than 800 HV.

15. The drum of claim 14 wherein the core material is tungsten carbide.

16. A system for the debarking of wood, which system comprises a debarking drum apparatus, which includes an essentially horizontal cylindrical drum which is supported to revolve around its longitudinal axis, wherein the drum comprises:

a first end for the feeding of wood into the drum;

a second end for the removing of wood from the drum, wherein an inner surface extends between the first end and the second end;

debarking iron sections extending inwardly from and fixed to the inner surface, the debarking sections extending in the longitudinal direction of the drum on an interior circumference of the drum, wherein the debarking iron sections are spaced in the circumferential direction to define gaps therebetween, the debarking iron sections positioned to lift input wood upwards on the circumference of the drum when the drum is revolving and to release the bark of the wood;

bark openings which extend through the drum from the inner surface to an exterior of the drum, the bark openings allowing the passage of bark which comes off from the wood, out of the drum;

rigid structure for the breaking of the bark of the wood for the debarking of the wood, which structure comprises studs for the breaking of the bark of the wood for the debarking of the wood, which studs are positioned either:

fixed on the inner surface of the drum between said debarking iron sections, and the studs are at the first end of the drum on a partial length of a total length of the drum between the first end and the second end; or on rotating elements that precede the drum.

17. A method for the debarking of wood using a debarking drum apparatus having an essentially horizontal cylindrical drum, which is supported to revolve around a longitudinal axis, the method comprising:

feeding wood into the drum from a first end while the drum is rotated;

lifting the wood which has been fed into the drum upwards by engaging debarking iron sections fixed to an interior of the drum with said wood in order to debark the wood as the wood drops on the wood in the drum, the debarking iron sections being spaced circumferentially to define gaps therebetween;

removing bark released from the wood through bark openings in the drum; and removing debarked wood from the rotating drum from a second end of the drum which is downstream of the first end; and breaking the bark of the wood fed into the drum by engaging a plurality of inwardly protruding rigid studs fixed to the interior of the drum and positioned to facilitate debarking, wherein the studs are fixed in the drum in the gaps between the debarking iron sections at the first end of the drum or are positioned ahead of the first end of the drum as part of a separate structure rotating for the breaking of bark, the separate structure being positioned ahead of the first end of the drum and feeding into the drum.

* * * * *